(12) United States Patent
Bria

(10) Patent No.: US 8,758,693 B2
(45) Date of Patent: Jun. 24, 2014

(54) ELECTRIC VALVE LEFT MECHANISM

(75) Inventor: Michael P. Bria, Green Bay, WI (US)

(73) Assignee: MegTec Systems, Inc., DePere, WI (US)

( * ) Notice: Subject to any disclaimer, the term of this patent is extended or adjusted under 35 U.S.C. 154(b) by 1136 days.

(21) Appl. No.: 12/363,794

(22) Filed: Feb. 2, 2009

(65) Prior Publication Data
US 2010/0196220 A1    Aug. 5, 2010

(51) Int. Cl.
*F27D 17/00*    (2006.01)

(52) U.S. Cl.
USPC ............................ 422/175; 137/311; 432/180

(58) Field of Classification Search
USPC ................... 422/175, 178; 432/180; 137/311, 137/596.17; 251/129.01, 129.11, 129.12, 251/129.13, 164, 188, 264
See application file for complete search history.

(56) References Cited

U.S. PATENT DOCUMENTS

| | | | |
|---|---|---|---|
| 4,172,394 A | 10/1979 | Kudo et al. ...................... 74/850 |
| 5,137,257 A * | 8/1992 | Tice .......................... 251/129.11 |
| 5,224,512 A * | 7/1993 | Nogami et al. ................ 137/554 |
| 5,417,404 A | 5/1995 | Varden .......................... 251/161 |
| 6,039,927 A | 3/2000 | Greco ........................... 422/175 |
| 6,261,092 B1 | 7/2001 | Cash ............................ 432/179 |
| 6,666,294 B2 | 12/2003 | Edson et al. ................... 180/444 |
| 6,669,472 B1 | 12/2003 | Cash et al. ..................... 432/179 |
| 6,915,887 B2 | 7/2005 | Faller et al. ................... 192/48.2 |
| 7,308,904 B2 | 12/2007 | Bria et al. ...................... 137/311 |

OTHER PUBLICATIONS

The International Search Report with Written Opinion dated Oct. 5, 2009.
International Preliminary Report on Patentability mailed Dec. 12, 2011 in corresponding PCT Application No. PCT/US09/53637.

* cited by examiner

*Primary Examiner* — Jill Warden
*Assistant Examiner* — Joye L Woodard
(74) *Attorney, Agent, or Firm* — Nields, Lemack & Frame, LLC

(57) ABSTRACT

A valve lift mechanism for actuating a valve in the vertical direction, and a regenerative thermal oxidizer including the valve and lift mechanism is disclosed. The valve is allowed to move vertically and oscillating rotary motion is possible. Vertical movement is achieved using the valve lift mechanism without the use of compressed air. In certain embodiments, the valve lift mechanism includes a torque motor. Preferably, a non self-locking screw jack is used to adjust the vertical height of the valve. Vertical movement can reduce the torque needed to rotate the valve, and also facilitates servicing of the valve. For example, if the valve experiences high temperature, and consequently expands, rotating the valve against the mating seal plate can be difficult, if not impossible. By lowering the valve slightly, the frictional forces between the valve and the mating seal plate are reduced, allowing freer rotational movement of the valve.

12 Claims, 5 Drawing Sheets

ELECTRIC DRIVER PROCESS DESCRIPTION

ELECTRIC VALVE LEFT MECHANISM

BACKGROUND OF THE INVENTION

Regenerative thermal oxidizers are conventionally used for destroying volatile organic compounds (VOCs) in high flow, low concentration emissions from industrial and power plants. Such oxidizers typically require high oxidation temperatures in order to achieve high VOC destruction. To achieve high heat recovery efficiency, the "dirty" process gas which is to be treated is preheated before oxidation. A heat exchanger column is typically provided to preheat these gases. The column is usually packed with a heat exchange material having good thermal and mechanical stability and sufficient thermal mass. In operation, the process gas is fed through a previously heated heat exchanger column, which, in turn, heats the process gas to a temperature approaching or attaining its VOC oxidation temperature. This pre-heated process gas is then directed into a combustion zone where any incomplete VOC oxidation is usually completed. The treated, now "clean", gas is then directed out of the combustion zone and back through the heat exchanger column, or through a second heat exchange column. As the hot oxidized gas continues through this column, the gas transfers its heat to the heat exchange media in that column, cooling the gas and pre-heating the heat exchange media so that another batch of process gas may be preheated prior to the oxidation treatment. Usually, a regenerative thermal oxidizer has at least two heat exchanger columns which alternately receive process and treated gases. This process is continuously carried out, allowing a large volume of process gas to be efficiently treated.

The performance of a regenerative oxidizer may be optimized by increasing VOC destruction efficiency and by reducing operating and capital costs. The art of increasing VOC destruction efficiency has been addressed using, for example, means such as improved oxidation systems and purge systems (e.g., entrapment chambers), and three or more heat exchangers to handle the untreated volume of gas within the oxidizer during switch-over. Operating costs can be reduced by increasing the heat recovery efficiency, and by reducing the pressure drop across the oxidizer. Operating and capital costs may be reduced by properly designing the oxidizer and by selecting appropriate heat transfer packing materials.

An important element of an efficient oxidizer is the valving used to switch the flow of process gas from one heat exchange column or bed to another. Any leakage of untreated process gas through the valve system will decrease the efficiency of the apparatus. In addition, disturbances and fluctuations in the pressure and/or flow in the system can be caused during valve switch-over and are undesirable. Valve wear is also problematic, especially in view of the high frequency of valve switching in regenerative thermal oxidizer applications.

U.S. Pat. No. 6,261,092, the disclosure of which is hereby incorporated by reference, discloses a switching valve suitable for regenerative thermal oxidizers that addresses the foregoing issues. The drive system disclosed in the '092 patent is of the rack and pinion type with pneumatic cylinder actuation.

The rack and pinion pneumatically powered drive system has a number of limitations. First, it is a constant force design since the pneumatic air supply is typically regulated to a constant pressure. However, the conditions acting on the rotary switch valve will vary and result in varying force on the valve sealing surface. The resulting friction at the top sealing surface of the valve is a major factor in determining the force required to rotate the valve. Since this force is not constant, and the pneumatic cylinder actuation force is relatively constant, the performance of the drive system will vary. In some cases, it may not be able to rotate the valve. In other cases, it may rotate the valve too quickly and overcome the means to stop the valve.

A second limitation of the pneumatically actuated drive system is the minimal braking capacity of the pneumatic cylinder. Typically, only pneumatic air cushions or rubber cushions are available to absorb the energy of the moving drive and valve. Only small valves can be safely braked by these devices. Larger valves require that external energy absorbing devices such as shock absorbers be used to brake the valve. These devices increase the cost and reduce reliability of the drive.

A third limitation of the pneumatically actuated drive is that use in cold environments requires an extremely dry air supply to prevent ice blockage of the air line. This requires the addition of an expensive air drying device.

Finally, the rack and pinion pneumatic drive system has mechanical stops which are used to locate the valve accurately. However, failure of the valve braking device or rotating the valve too quickly and exceeding the capacity of the braking device may allow the drive and/or valve to become damaged by impact with the stops.

U.S. Pat. No. 7,308,904, the disclosure of which is hereby incorporated by reference, discloses a switching valve suitable for regenerative thermal oxidizers that addresses many of these issues. The drive system disclosed in the '904 patent includes a gear, gearbox, variable speed drive and at least one positioning sensor.

While this device has significant advantages over the prior art, there are several shortcomings. First, the vertical movement of the valve is provided using a pneumatic cylinder. This device requires compressed air to lift the valve. Such system may be susceptible to maintenance issues, especially in freezing temperatures. The range of vertical movement of the valve can also be somewhat limited when using a pneumatic cylinder.

Thus, it would be desirable to provide an alternative valve lift mechanism for a rotary valve, such as for the valve disclosed in the '092 and '904 patents, that allows for smooth and reliable operation, is cost effective, can lower the valve for servicing, can tolerate high and low temperatures and any expansion associated therewith, and is low maintenance. It also would be desirable to provide a regenerative thermal oxidizer that utilizes a valve equipped with such a valve lift mechanism.

SUMMARY OF THE INVENTION

The problems of the prior art have been overcome by the present invention, which provides a valve lift mechanism, including a non-self locking screw jack, for actuating the valve in the vertical direction, and a regenerative thermal oxidizer including the valve and lift mechanism. A valve drive system allows for the starting and stopping of the rotation of a rotary valve with accurate positioning. The valve is allowed to move vertically and oscillating rotary motion is possible. Vertical movement is achieved using the valve lift mechanism without the use of compressed air. In certain embodiments, the valve lift mechanism includes a torque motor.

In certain embodiments, the valve with which the lift mechanism is used has a seal plate that defines two chambers, each chamber being a flow port that leads to one of two regenerative beds of an oxidizer. The valve also includes a switching flow distributor which provides alternate channeling of the inlet or outlet process gas to each half of the seal plate. The valve operates between two modes: a stationary mode and a valve movement mode. In the stationary mode, a tight gas seal is used to minimize or prevent process gas leakage. The gas seal also seals during valve movement. The valve is a compact design, thereby eliminating ducting typically required in conventional designs. This provides less volume for the process gas to occupy during cycling, which leads to less dirty process gas left untreated during cycling. Associated baffling minimizes or eliminates untreated process gas leakage across the valve during switch-over. The use of a single valve, rather than the two or four conventionally used, significantly reduces the area that requires sealing. The geometry of the switching flow distributor reduces the distance and number of turns the process gas goes through since the flow distributor can be located close to the heat exchange beds. This reduces the volume of trapped, untreated gas during valve switching. Since the process gas passes through the same valve ports in the inlet cycle as in the outlet cycle, gas distribution to the heat exchange beds is improved.

Vertical movement is achieved without the use of compressed air. Preferably, a screw jack is used to adjust the vertical height of the valve. Vertical movement can reduce the torque needed to rotate the valve, and also facilitates servicing of the valve. For example, if the valve experiences high temperature, and consequently expands, rotating the valve against the mating seal plate can be difficult, if not impossible. By lowering the valve slightly, the frictional forces between the valve and the mating seal plate are reduced, allowing freer rotational movement of the valve.

DETAILED DESCRIPTION OF THE PRESENT INVENTION

Figure 1:
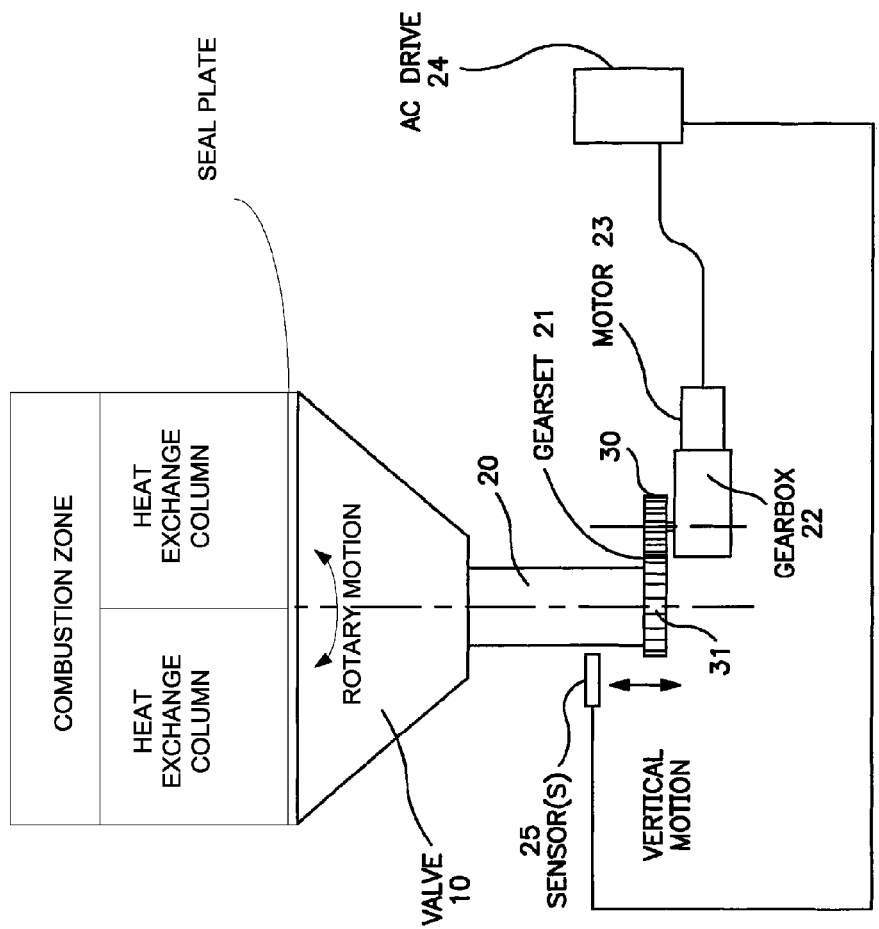
FIG. 1 is a schematic view of a valve equipped with the electric gear drive that can be used with the present invention.

Turning first to FIG. 1, there is shown schematically the electric gear motor drive system, which can be used with one embodiment of the present invention, coupled to a rotary valve 10. The valve 10 includes a shaft 20 connected to a gear set 21. The gear set 21 is driven by gears housed in gear box 22, which are driven by motor 23 powered by an AC drive 24 as shown. In the embodiment shown, the gear box 22 is supported by a gearbox mounting plate (not shown) that is in turn supported by a pair of spaced base frame mounting beams. This structure is capable of withstanding the torque that occurs during operation of the system. Gear set 21 is made up of gears 30 and 31. Gear 30 mates to gear 31 mounted to the valve, such as on shaft 20. Gear 30 is driven by the gears in the gear box 22, which in turn are driven by motor 23. Preferably the gears 30, 31 are spur gears to allow the assembly to accommodate vertical motion of the valve 10.

The main function of the gearbox 22 is to increase the torque output and reduce the speed of the electric motor 23 used to actuate the valve. Thus, the gearbox 22 provides the proper torque and output speed for the high speed motor 23. For example, a 5 horsepower, 1800 rpm motor with a 125:1 gear reduction can provide an output speed of about 14 rpm and a starting torque of about 2000 ft-lbs (compared to torque of only about 15 to 16 ft-lbs. without the gear reduction). The mating gears 30 and 31 do not need to be the same size. These gears can be used as a second speed reducer set, particularly when the speed reduction desired requires more than one stage.

Suitable gearboxes 22 include right-angle gearboxes and in-line (i.e., planetary style) gearboxes, with the former being preferred in view of space constraints. In a right-angle gear set, the axes of the input and output shafts are perpendicular rather than in-line, and thus the overall height of the gear train is less than with in-line configurations.

The desired torque increase from the electrical motor could be obtained through means other than a gearbox with the appropriate gear reduction. For example, a gearbox combined with a belt drive system could be used. Alternatively, multiple stages of belt drives could be used.

The electric motor 23 is typically about 460 volts, 60 cycle, 1800 rpm and is powered by a suitable alternating current source.

One or more position sensors, such as inductive proximity sensors, are preferably used to sense the position of the valve in order to accurately and reproducibly stop the valve at the desired location to ensure proper sealing. Preferably a first sensor is positioned to trigger the deceleration of the motor, and a second or stop sensor is positioned to stop the motor. The precise location of these sensors is within the skill in the art. Suitable alternative means of determining position of the valve include a limit switch and actuator such as a cam, an encoder, counting of gear teeth with a proximity sensor, a photo eye and light source, and a Hall effect vane switch.

Figure 2A:
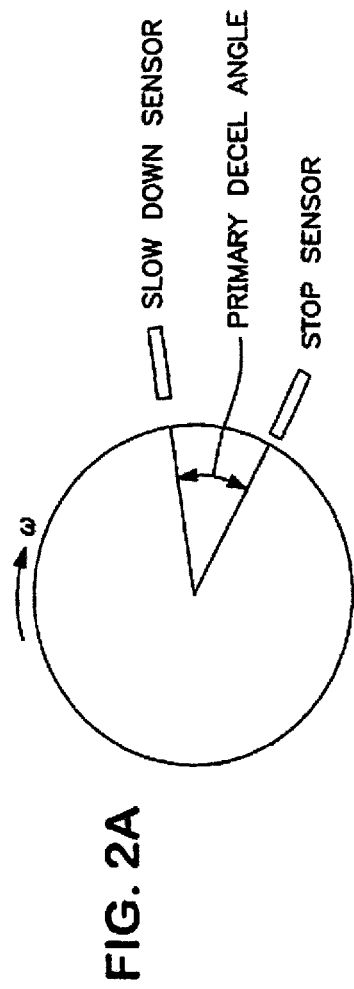
FIGS. 2a and 2b illustrate the rotary movement of the valve used with the present invention.
Figure 2B:
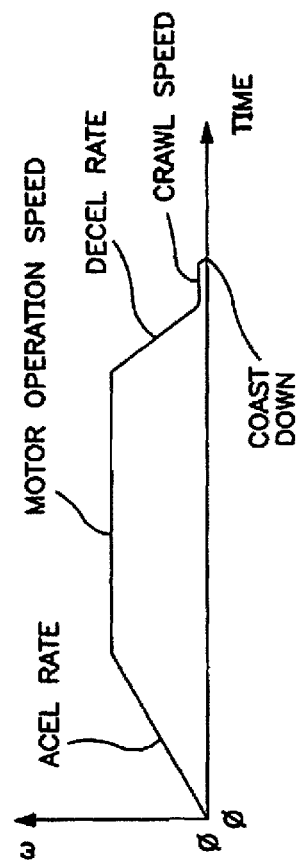

FIGS. 2A and 2B summarize the operation of the electric gear drive of the present invention. In operation, the motor accelerates to operating speed, which in the embodiment illustrated is in the range of about 875 to 1750 rpm at 30 to 60 Hz. The motor then operates at this predetermined set speed until the slow down sensor is triggered, whereupon the motor is decelerated by the AC drive to crawl speed, typically 90 rpm at 3 Hz. The motor runs at crawl speed until the stop sensor is triggered. For example, for the 180 degrees of valve rotation during a switch, the actual amount of rotation of the valve during crawl mode is about 2 degrees. Once the stop sensor is triggered, the motor is decelerated from crawl speed to a stop. This sequence also is shown graphically in FIG. 2B. Valve switch time specifications preferably are chosen to minimize the capture chamber volume in the regenerative thermal oxidizer. The capture chamber prevents release of uncleaned gas during the valve switch operation. The faster the valve switches, the smaller the capture chamber can be. Thus, there is no lower specification limit for valve switch time. The upper limit is based upon the capabilities of the drive and is generally set at less than five (5) seconds, not including the time in crawl mode. During crawl mode, the seal plate is already adequately aligned to prevent release of uncleaned gas. While this example utilizes 2 sensors to achieved the desired rotation profile, the invention is not so limited. In other embodiments, a single sensor is used, whereby the controller utilizes other information (such as elapsed time) to stop the rotation. In yet other embodiments, angular rotation is directly monitored.

Figure 3:
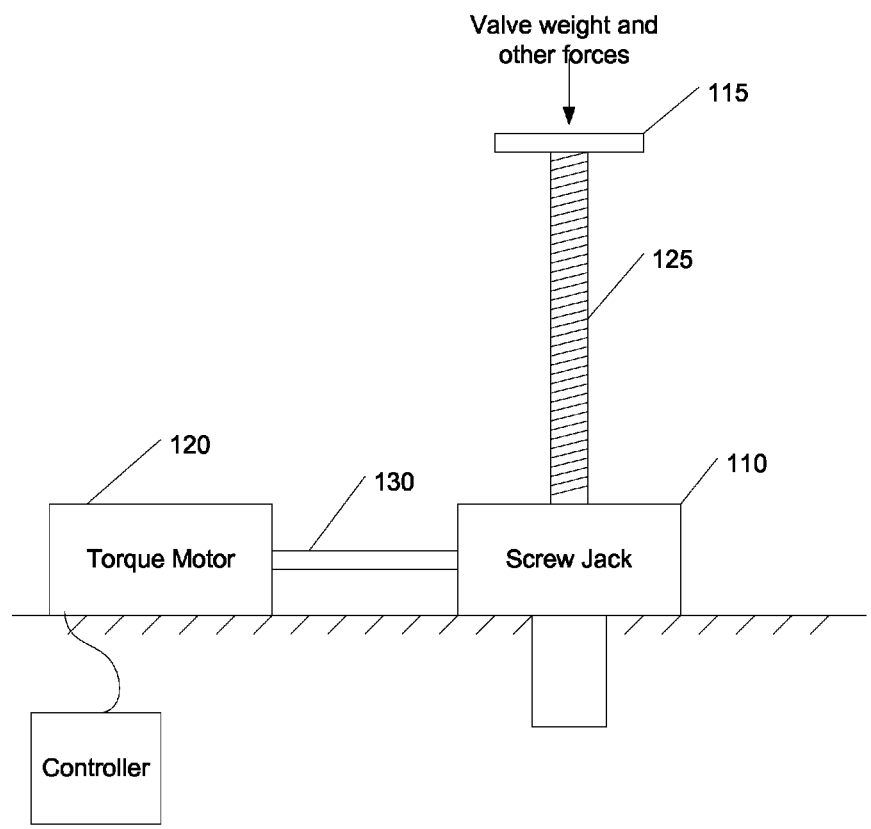
FIG. 3 is a schematic view of one embodiment of the valve lift mechanism of the present invention.

Vertical motion is typically done using a non-self-locking screw jack. FIG. 3 illustrates one embodiment of the valve lift mechanism 100. Non-self locking screw jack 110 is used to vertically support the valve. When rotated in one direction, the platform 115 of the screw jack moves upward, while rotation in the opposite direction causes downward movement. In one embodiment, the screw jack is preferably in communication with a torque motor 120.

Screw jacks have a worm shaft 130, whereby rotations of the worm shaft cause a corresponding rotation of the lifting screw 125. In certain embodiments, a gear ratio, such as between 1:1 and 25:1, is used between the worm gear (located on the worm shaft) and the lifting screw 125. In other words, one rotation of the worm shaft 130 causes a different number of rotations of the lifting screw 125, where the gear ratio determines that value. A self-locking screw jack is one in which the height reached by the lifting screw is maintained, even in the absence of input torque on the worm shaft. While this behavior is advantageous in many applications, such as car jacks, the present invention preferably utilizing a screw jack which does not self-lock. In one embodiment, a ball screw jack with a low gear ratio is preferred, such that the screw jack is not self-locking. Although ball screw jacks do not have locking mechanisms, per se, high gear ratios may cause the jack to behave as though self-locking. In the preferred embodiment, the lifting screw is designed such that about 25 rotations are required to adjust the height of the platform by 1 inch.

Since the screw jack 110 is not self-locking, downward forces, such as gravitational force and forces of expansion on the valve, will press down on the platform 115, causing the lifting screw 125 to rotate so as to lower its height. This counter-rotation of the lifting screw 125 will cause a counter-rotation of the worm shaft 130. In one embodiment, a torque motor 120 is used to drive the worm shaft. A torque motor is a specialized type of induction motor that can operate in a stalled condition and can maintain a constant torque for extended periods of time. These motors are advantageous in tension control devices, such as devices that wind a web of paper or film material. In one embodiment, a torque motor 120 is used to drive the worm shaft 130 with a constant torque. This torque guarantees that the valve is pressed up against the mating seal plate with a specific amount of force. Knowing the weight of the valve, it is then possible to determine the force exerted on the mating seal. This position is held, as the torque motor will remain stalled as long as the system remains at this equilibrium point. However, if the valve is exposed to high temperatures and expands, it exerts more force on the mating seal plate, which in turn results in a greater force seen by the lifting screw 125. This force is higher than the torque provided by the torque motor 120, and as a result, the lifting screw rotates so as to lower the platform 115. When the downward forces equal the applied torque, the lifting screw 125 stops rotating and the platform 115 reaches a new equilibrium position. As the valve cools and contracts, the downward forces decrease, which allows the torque motor 120 to return the platform 115 to its nominal position.

Additionally, the torque supplied by the motor 120 can be varied as a function of the valve rotation. For example, the lifting screw 125 can be rotated downward one or more turns to lessen the force of the valve against the mating seal plate. When the rotation of the valve is completed, the lifting screw rotates, returning the platform to its nominal height. In one embodiment, a controller is used to control the movement of the valve. That controller, using the information concerning the position of the valve, is able to affect the torque supplied by the motor 120.

Figure 4:
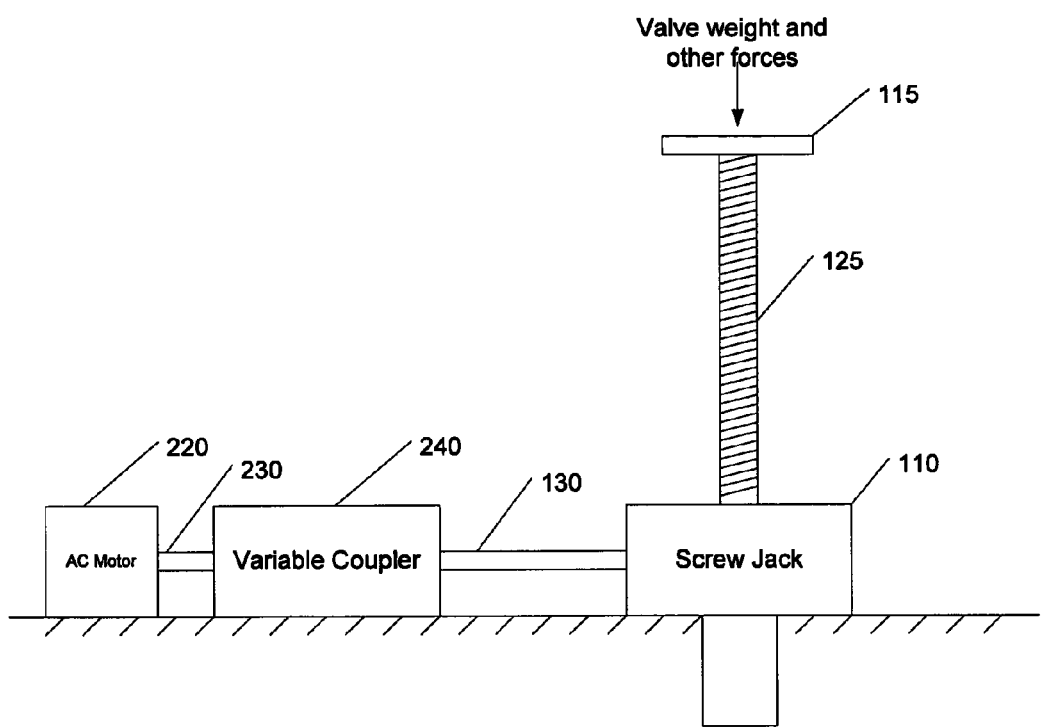
FIG. 4 is a schematic view of a second embodiment of the valve lift mechanism of the present invention.

While a torque motor is one embodiment, there are other embodiments that are equally applicable as well. In a second embodiment, shown in FIG. 4, a standard AC motor 220 is used in conjunction with a variable coupling apparatus 240. In this way, the AC motor 220 is able to rotate at a constant speed. The coupling apparatus 240 joins the output shaft 230 from the AC motor 220 to the worm shaft 130 of the jack screw 1110. Since the output shaft 230 and the worm shaft 130 are not directly coupled, rotation by the AC motor 220 may not produce a corresponding rotation by the worm shaft 130. Thus, if the lifting screw 125 is rotated downward in response to increased force by the valve, the variable coupling 240 absorbs this rotational energy. This allows the AC motor 220 to continue its normal rotation. In both embodiments, the system is capable of supplying a constant torque, without risk of damage to the motor. By supplying constant torque, the valve lift mechanism is able to provide constant force between the valve and mating seal plate, thereby insuring a tight integral seal.

Several different types of variable coupling devices can be used. In one embodiment, an eddy current clutch is used. An eddy current clutch utilizes electromagnetic fields to induce rotation of the worm shaft 130, based on rotation of the AC motor output shaft 230. Briefly, the AC motor output shaft 230 drives a rotating electromagnet that induces eddy currents in a metal disk or drum. The magnetic field of the worm shaft interacts with the induced eddy currents to create torque in the worm shaft. In another embodiment, a hysteresis clutch is used to couple the AC motor output shaft 230 to the worm shaft 130. In yet another embodiment, a magnetic particle, powder or magnetic fluid clutch is used to couple the AC motor to the worm shaft.

Alternatively, a fluid coupler can be used, similar to those provided in automotive transmissions. These couplers utilize a fluid, typically oil, to transfer power to the output shaft. The rotation of the shaft within the fluid creates centripetal forces, which then drive the worm shaft.

The vertical movement of the platform 115 in response to valve expansion is still possible, as the variable coupler 240 will absorb the rotational energy supplied by the lifting screw 125. Furthermore, the vertical position of the platform 115, and thus the valve, can also be manually adjusted by varying the rotational speed of the AC motor 220. As the rotational speed of the AC motor 220 is decreased, the resulting output torque is reduced. Therefore, less force is provided to maintain the vertical position of the platform 115. If the rotational speed is sufficiently reduced, the weight of the valve will cause the platform 115 to lower, even while the AC motor 220 is being forward driven. Alternatively, the AC motor 220 can be reverse biased, so that its output shaft 230 rotates in the opposite direction, thereby lowering the height of the platform 115.

Typically, a variable speed drive is used to vary the speed of an AC motor. In some embodiments, the variable speed drive modulates the frequency of the alternating current, which changes the resulting rotational speed of the motor. Other variations of variable speed motors can be used with the variable coupling device. For example, a multiple speed motor or a DC motor with an automated rheostat control could be used in place of the AC motor and variable speed drive.

Figure 5:
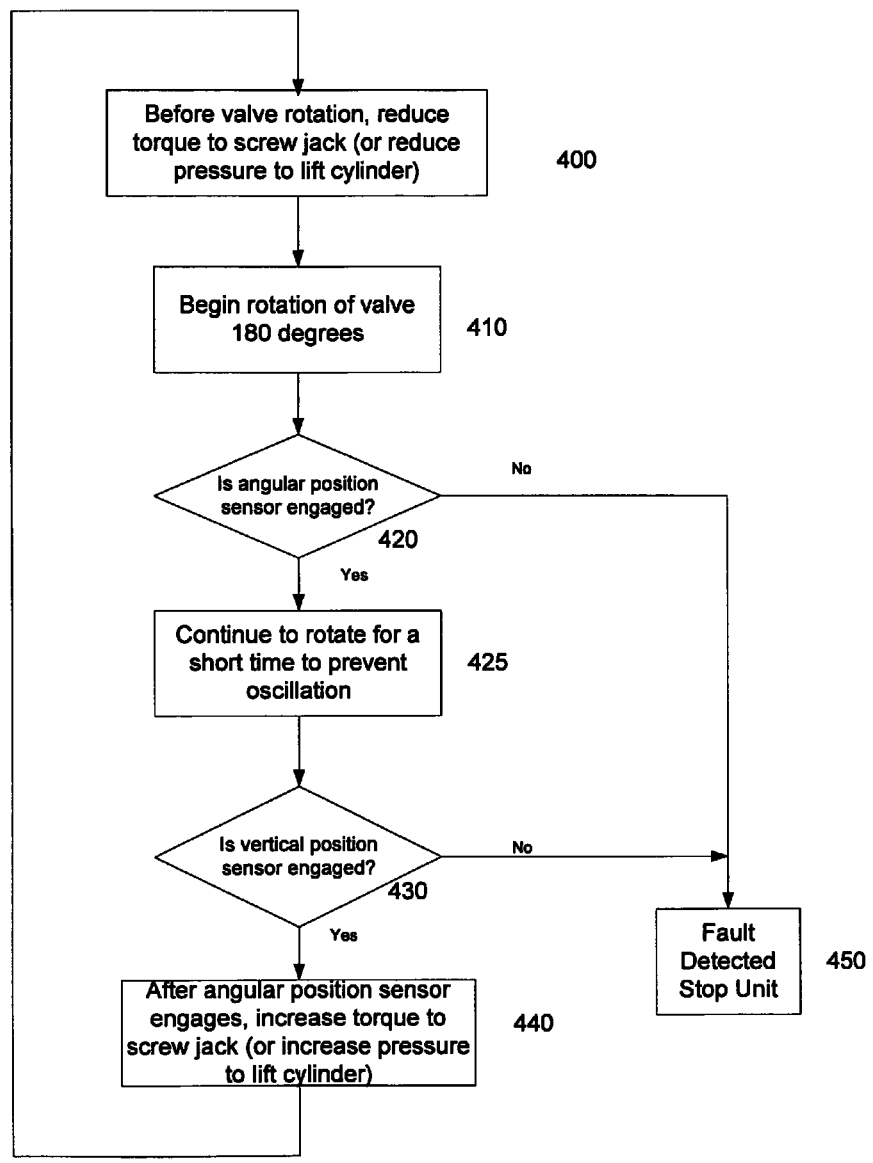
FIG. 5 is a flowchart showing the interaction between the valve rotation and the lift mechanism.

As noted above, in certain embodiments, the lift mechanism is used in conjunction with the electric gear, to reduce the friction experienced as the valve is rotated, thereby reducing the torque and time required to move the valve. For example, FIG. 5 shows a representative flowchart showing the interaction between these components. Box 400 indicates that some time before the valve is scheduled to begin its rotation, the torque is reduced to the screw jack. This time can vary, and typically must be sufficient to allow the valve to move away from the mating seal plate. This decrease in torque lowers the friction between the valve and the sealing plate. Sufficient time is given to allow the change in torque to take effect. In some case, this time is about 15 seconds, although other time values are within the scope of the invention. After the torque has been reduced, the rotation of the valve begins, as shown in Box 410. Decision Boxes 420 and 430 check for error conditions. In the case where one or more of the sensors are not working, the unit stops operation, as shown in Box 450. Returning to the normal flow path, after the angular position sensor has engaged, the valve continues to rotate for a short time, such as 0.2 seconds to prevent oscillation, as shown in Box 425. When the valve reaches its end position, which can be signaled via a sensor in Decision Box 430, the torque is increased, thereby increasing the friction between the components and creating a tighter seal, as shown in Box 450. The process then repeats continuously.

This flowchart is only one embodiment showing the interaction between the valve rotation and its vertical movement. In other embodiments, other indicators may be used to determine when to reduce the torque applied by the electric motor. For example, a sensor-less system may use timers to determine when to lower the applied torque and when to increase it again.

While the present disclosure describes the use of the electric valve lift mechanism in conjunction with a regenerative thermal oxidizer, the invention is not limited to this embodiment. The present invention can be used for any application in which a valve must be pressed against a seal plate with a constant force.

What is claimed is:

1. A regenerative thermal oxidizer comprising at least first and second heat exchange columns each in communication with a combustion zone, a valve for directing gas flow into and out of said columns, said valve in contact with a seal plate, and an electric valve lift mechanism for actuating said valve, adapted to hold said valve in contact with said seal plate, wherein said electric valve lift mechanism comprises a motor and a non self-locking screw jack.

2. The oxidizer of claim 1, wherein said electric valve lift mechanism causes said valve to apply a constant force against said seal plate.

3. The oxidizer of claim 1, wherein said electric valve lift mechanism comprises a torque motor.

4. The oxidizer of claim 1, wherein said electric valve lift mechanism comprises an AC motor, and a variable coupler connecting said motor and said screw jack.

5. The oxidizer of claim 4, wherein said variable coupler comprises an eddy current clutch.

6. The oxidizer of claim 4, wherein said variable coupler comprises a hysteresis clutch.

7. The oxidizer of claim 4, wherein said variable coupler comprises a fluid coupler.

8. The oxidizer of claim 4, wherein said variable coupler comprises a magnetic clutch.

9. The oxidizer of claim 4, wherein said electric valve lift mechanism comprises a variable speed drive to vary the rotational speed of said AC motor.

10. The oxidizer of claim 1, wherein said valve comprises a rotary valve and is controlled by a second motor, and further comprising a controller in communication with said second motor for controlling the rotational movement of said valve.

11. The oxidizer of claim 10, wherein said controller is in communication with said electric valve lift mechanism and said electric valve lift mechanism varies the force applied by said valve against said seal plate in response to said controller.

12. The oxidizer of claim 11, wherein said electric valve lift mechanism reduces said force applied by said valve against said seal plate while said valve is rotating.

* * * * *